US006171699B1

(12) United States Patent
Deleuil et al.

(10) Patent No.: US 6,171,699 B1
(45) Date of Patent: Jan. 9, 2001

(54) SPHEROIDAL SILICA PARTICULATES USEFUL AS REINFORCING FILLERS FOR ELASTOMERS

(75) Inventors: Michel Deleuil; Francois Parmentier, both of Lyons (FR)

(73) Assignee: Rhone-Poulenc Chimie, Courbevoie Cedex (FR)

( * ) Notice: Under 35 U.S.C. 154(b), the term of this patent shall be extended for 0 days.

(21) Appl. No.: 08/400,515

(22) Filed: Mar. 7, 1995

Related U.S. Application Data

(63) Continuation of application No. 08/250,950, filed on May 27, 1994, now abandoned, which is a continuation of application No. 07/917,750, filed on Jul. 24, 1992, now abandoned, which is a continuation of application No. 07/569,212, filed on Aug. 17, 1990, now abandoned, which is a continuation of application No. 07/059,636, filed on Jun. 8, 1987, now abandoned.

(30) Foreign Application Priority Data

Jun. 6, 1986 (FR) .................................... 86 08160
Apr. 17, 1987 (FR) .................................... 87 05502

(51) Int. Cl.$^7$ ....................................... B32B 5/16
(52) U.S. Cl. .......................... 428/402; 423/335; 423/339
(58) Field of Search ............................ 428/402; 423/335, 423/339

(56) References Cited

U.S. PATENT DOCUMENTS

| 3,646,183 | | 2/1972 | Topcik . | |
|---|---|---|---|---|
| 4,173,491 | | 11/1979 | Abrams et al. . | |
| 4,199,479 | * | 4/1980 | Wilkes | 502/174 |
| 4,251,281 | | 2/1981 | Machurat et al. . | |
| 4,508,607 | * | 4/1985 | Winyall | 423/335 |
| 5,009,874 | * | 4/1991 | Parmentier et al. | 423/335 |
| 5,635,214 | * | 6/1997 | Ponchon et al. | 424/489 |

FOREIGN PATENT DOCUMENTS 2353486    12/1977    (FR) .

OTHER PUBLICATIONS

Webster'II New University Dictionary, p. 992.*
Concise Chemical and Technical Dictionary, ed. by H. Bennett Chemical Publishing Co., Inc. New York, NY p. 384.*

* cited by examiner

*Primary Examiner*—Jenna Davis
(74) *Attorney, Agent, or Firm*—Burns, Doane, Swecker & Mathis, L.L.P.

(57) ABSTRACT

Essentially spherical silica-based granular particulates, whether having a mean particle size of at least 300 $\mu$m and a density of from 0.15 to 0.32, or a mean particle size of from 80 $\mu$m to 400 $\mu$m and a density of at least 0.32, are well adapted as reinforcing filler material for a variety of elastomeric matrices, e.g., rubber.

17 Claims, No Drawings

SPHEROIDAL SILICA PARTICULATES USEFUL AS REINFORCING FILLERS FOR ELASTOMERS

This application is a continuation, of Application Ser. No. 08/250,950, filed May 27,1994 now abandoned; which is a continuation of Ser. No. 07/917,750, filed Jul. 24, 1992, now abandoned; which is a continuation of Ser. No. 07/569,212, filed Aug. 17, 1990, now abandoned; which is a continuation of Ser. No. 07/059,636, filed Jun. 8, 1987, now abandoned.

BACKGROUND OF THE INVENTION

1. Field of the Invention

The present invention relates to novel silica-based granular particulates, to various processes for the preparation thereof, and to the use of such novel silica particulates as reinforcing fillers for elastomeric matrices.

2. Description of the Prior Art

It has long been known to this art to use precipitated silica as a white reinforcing filler material for elastomers.

However, like any reinforcing filler, it must be suitable for processing and easily formulated into mixtures.

Its powder form is unsatisfactory to the extent that it gives rise to an appreciable amount of dust and is slow to be formulated into mixtures (low apparent density).

A granular form has heretofore been proposed which provides an appropriate solution for the aforesaid two problems, but which often results in inadequate dispersion of the filler in elastomeric matrices.

Various solutions too have been proposed to avoid this particular disadvantage.

Thus, European Patent No. 18,866, assigned to the assignee hereof, describes granular silica materials in the form of homogeneous spheres having a mean particle size greater than 80 $\mu$m, in particular from 200 to 300 $\mu$m.

The spherical particulates are made by atomizing a precipitated silica suspension.

Because of its properties, this type of product was found to be especially attractive for reinforcing elastomers.

However, need still exists for an improved product in respect of one or possibly several aspects at the same time. Thus, the need remains in this art for silica particulates having a potentially higher and more homogeneous granulometry, which are denser, have an even lower proportion of fines, and which are less fragile.

Moreover, the preparative processes for granules and especially those described above, conventionally entail the use of atomizers. These devices impose certain requirements on the suspensions to be atomized, especially with regard to the dry solids content thereof, which cannot exceed a certain maximum value. They also entail considerable maintenance.

These processes also suffer from the disadvantage of limiting the products obtained to a certain granulometry range, especially because of the low dry solids content mentioned above.

Thus, another problem exists in this art, namely, simplifying the processes for the preparation of silica particulates and enhancing the number of options provided thereby.

SUMMARY OF THE INVENTION

Accordingly, a major object of the present invention is the provision of improved silica-based granular particulates having enhanced properties and characteristics vis-a-vis those of the prior art.

Another object of this invention is the provision of simplified processing for the production of such improved silica particulates, which processing provides a broad spectrum of available options.

Briefly, the present invention features improved silica-based granular particulates, in the form of substantially spherical particles having a mean size of at least 300 $\mu$m, and an apparent density ranging from 0.15 to 0.32.

In a second embodiment of the invention, the silica-based granular material is a densified granulate comprising substantially spherical particulates having a mean size of at least 80 $\mu$m and a relative density greater than 0.32.

This invention also features a process, in particular for the preparation of granular particulates according to the first embodiment noted hereinabove.

This process according to the invention comprises the following stages:

(i) contacting and intimately admixing a suspension of silica, at least one hydrophobizing agent and at least one slightly or non-water-miscible organic solvent, thereby producing a liquid phase substantially free of silica and a plurality of silica-based granules;

(ii) separating said liquid phase from the granules; and (iii) optionally washing and then drying said granules.

This invention also features a second process especially adapted for the preparation of granular particulates according to the aforesaid second embodiment.

This second preparative process according to the invention is characterized in that it comprises the following steps:

(i) contacting and intimately admixing a suspension of silica, at least one hydrophobizing agent and at least one slightly or non-water-miscible organic solvent, thereby producing a liquid phase substantially free of silica and a plurality of silica-based granules;

(ii) separating the liquid phase from the granules; and (iii) densifying said granules thus separated.

The aforenoted processes are reliable and flexible. Indeed, they require only simple and inexpensive equipment. They make it possible to obtain products over an entire range of sizes and densities.

Finally, in a general manner, this invention features any silica-based granular material made using the two processes described above.

DETAILED DESCRIPTION OF THE PREFERRED EMBODIMENTS OF THE INVENTION

More particularly according to the present invention, as aforesaid, two types of products are produced, and each will be described in greater detail below.

Both cases involve silica-based granular particulates. According to this invention, the term "silica-based" is intended broadly to mean granules composed essentially of elements or a mixture of elements selected from among the silicic acids, silica, silicates and silico-aluminates.

The granular materials according to the invention are typically based on precipitated silica. They are in the form of substantially spherical particulates.

For the first type of granules, i.e., according to the first embodiment, the mean particle size is at least 300 $\mu$m. In a preferred embodiment, the mean particle size of the granules ranges from 300 to 2500 $\mu$m, more preferably from 350 to 1000 $\mu$m.

Their apparent density ranges from 0.15 to 0.32 g/ml. This is the density of filling in the compacted state according to AFNOR standard No. T 30-42. More preferably, such density ranges from 0.20 to 0.30 g/ml.

These particular granules are comprised of a silica having a BET surface area typically of at least 50 m$^2$/g. Advantageously, it ranges from 50 to 350 m$^2$/g, and preferably from 100 to 300 m$^2$/g.

BET specific surface area is determined according to the BRUNAUER-EMMET-TELLER method described in the *Journal of the American Chemical Society*, 60, p. 309 (February, 1938).

The CTAB surface area of the silica constituting the subject granules is advantageously at least 40 m$^2$/g. More preferably it ranges from 40 to 320 m$^2$/g, and even more preferably from 80 to 270 m$^2$/g.

The CTAB surface area is the external surface area determined by absorption of cetyl trimethyl ammonium bromide at pH 9 according to the method described by JAY, JANSEN and G. KRAUS in *Rubber Chemistry and Technology*, 44, p. 1287–1296 (1971).

Moreover, another characteristic of the granular particulates of this first type is their porosity.

As utilized herein, all pore volumes are determined using mercury porosity measurements, and the pore diameters are calculated using the WASHBURN equation, with an angle of contact theta=130° and a surface tension gamma=484 Dynes/cm.

The porosity measurements were carried out on products dried at 150° C. under a pressure of 1 Pa. The porosities specified reflect the intra-granular porosities and thus involve pores having diameters from $10\mu$ to $0.001\mu$.

The granular materials of the first type have a maximum total pore volume (VPT) of 3.6 cm$^3$/g, and more specifically between 3.6 cm$^3$/g for particulates having a density of 0.15 and 1.40 cm$^3$/g for particulates having a density of 0.32, the latter correlation being in relation to products of substantially monodispersed sizes.

In addition to this global pore volume, the same granules are characterized by pore distribution. Thus, these materials essentially meet the following conditions: a maximum of approximately 80% of the total pore volume is constituted by pores having a diameter at most substantially equal to the value provided below, as a function of the BET specific surface area:

50–100 m$^2$/g:0.12 $\mu$m
100–150 m$^2$/g:0.075 $\mu$m
150–200 m$^2$/g:0.050 $\mu$m
200–250 m$^2$/g:0.025 $\mu$m
>250 m$^2$/g:0.015 $\mu$m.

It will be appreciated that the purpose of the values given above is to reflect the general aspect of the characteristic porograms of these materials and that, as such, they can vary slightly.

Taking into account the preparative processes used, which will be described in detail below, the granules of the first type described above can be considered as the precursors of the granules according to the second embodiment.

The granular particulates of the second type differ from those of the first type, primarily by virtue of their densities, and, in certain cases, by virtue of greater diameters.

Indeed, their density is at least 0.32 g/ml.

They are in the form of substantially spherical particulates and their mean size may range from 80 $\mu$m to 400 $\mu$m according to a first embodiment, or greater than 400 $\mu$m according to a second embodiment.

According to a preferred embodiment of the second variation, their mean size ranges from 0.5 mm to 20 mm.

The density of the granules of this second type may also advantageously range from 0.32 to 0.5 g/ml.

The BET surface area of the silica from which they are constituted is advantageously at least 50 m$^2$/g. Typically, it ranges from 50 to 350, and more preferably from 100 to 300 m$^2$/g. The CTAB surface area is advantageously at least 40 m$^2$/g. Typically, it ranges from 40 to 320 m$^2$/g, and preferably from 80 to 270 m$^2$/g.

Finally, these granules of the second type have specific porosity characteristics.

Their maximum total pore volume is 1.40 cm$^3$/g, and it advantageously ranges from 1.40 to 0.7 cm$^3$/g for products having respective densities of 0.32 to 0.5. The latter correlation applies to products having substantially monodispersed sizes.

Moreover, with respect to the distribution of the pore volumes, these granules essentially meet the following conditions: a maximum of approximately 80% of the total pore volume is composed of pores having a diameter at most essentially equal to the value provided below, as a function of the BET specific surface area:

50–100 m$^2$/g:0.12 $\mu$m
100–150 m$^2$/g:0.075 $\mu$m
150–200 m$^2$/g:0.050 $\mu$m
200–250 m$^2$/g:0.025 $\mu$m
>250 m$^2$/g:0.015 $\mu$m.

It should be noted that this invention enables production of hydrophobic granular particulates. Not only can they have the aforedescribed characteristics for each type of granule, but they can contain approximately 0.5 to 35%, and advantageously from 1 to 10% by weight of hydrophobizing agent, depending upon the BET surface area of the silica.

The hydrophobic nature of the granules according to the invention is maintained over time.

The granules according to the invention present many advantages. Firstly, they are highly resistant to attrition. As such, they produce fewer fines during transportation or handling, especially when they are incorporated into rubber. Their density is high and they disperse very well in rubber. Their geometry can vary over a broad granulometric range, which makes them suitable for a variety of applications.

In this respect, in addition to the elastomer application, they can be used in all known applications for silica, for example, as fillers, adsorbents, etc.

Specific processes for the preparation thereof will now be described.

These processes involve a certain number of common steps which will be examined below.

The first step includes bringing together and intimately admixing a silica suspension, at least one hydrophobizing agent and at least one slightly or non-water miscible organic solvent.

It has now unexpectedly been discovered that granulation of the silica could be achieved by operating under these conditions. These various conditions will now be described in detail.

Silica Suspension

The silica suspension can be produced in any manner.

Typically, it is an aqueous solution produced by precipitating an alkaline silicate from a solution neutralized by an acidic agent, such as sulfuric acid or carbon dioxide gas.

It should be noted that the dry solids content of the suspension is not critical for the processes according to the invention.

Hydrophobizing Agent

A hydrophobizing agent is also used in the first step of the subject processes.

According to an important characteristic of the invention, the hydrophobizing agent must be cationic or amphoteric. Hydrophobizing agents suitable for the processes according to the invention are advantageously selected from among the primary, secondary and tertiary amines, or salts thereof, quaternary ammonium salts, amino acids or salts thereof.

Exemplary of the amines, the light amines are representative. These are amines having six or less carbon atoms in their hydrocarbon chain. More particularly, the $C_4$–$C_6$ amines are used.

The alicyclic amines are preferably employed. Exemplary thereof are n-butylamine and cyclohexylamine.

The fatty amines can also be used. By "fatty amines" are intended amines whose substituents are carbon chains having over 6, and more specifically 10 or more, carbon atoms.

Among the tertiary amines, exemplary are the dimethyl alkyl fatty amines having the formula $RN(CH_3)_2$, wherein R is typically a $C_8$–$C_{22}$ radical, preferably $C_8$–$C_{18}$, for example, a radical corresponding to the carbon chain of the fatty acids of tallow, copra and oleic acid, whether or not hydrogenated.

In the same group, illustrative are dialkylmethyl fatty amines having the formula $R_2NCH_3$, wherein the R radical is as defined immediately above.

Also within this same group, the trialkyl fatty amines having the formula $R_3N$, wherein R is also as defined above, too are representative.

Acetates may be used as the salts of the primary, secondary or tertiary amines.

Moreover, quaternary ammonium salts having the following formula (1) can also be used:

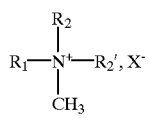
(1)

wherein $R_1$ is an alkyl or alkenyl radical preferably having 6 or more, and more specifically 10 or more carbon atoms; $R_2$ and $R_2'$ are alkyl, alkoxy or alkyl-phenyl radicals, which may be identical or different, and X is an anion.

Among these salts, the chlorides and sulfates are most representative.

As suitable hydrophobizing agents in this category, exemplary is that in which $R_1$ is the copra radical, $R_2$ is the benzyl radical, $R_2'$ is the methyl radical, and the anion is chlorine, a product marketed under the trademark NORAMIUM DA 50, and that in which $R_1$ is the radical corresponding to the carbon chain of fatty tallow acid, $R_2$ and $R'_2$ are identical and represent methyl, a product marketed under the trademark NORAMIUM MS80.

Diamines can also be used according to the invention.

Exemplary are diamines having the formula RNH—$(CH_2)_3$—$NH_2$ in which R is as defined above.

Quaternary diammoniums having the following formula (2) can also be used:

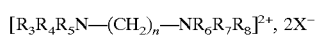
(2)

wherein $R_3$ is an alkyl or alkenyl radical having 8 or more carbon atoms;

$R_4$, $R_5$, $R_6$, $R_7$ and $R_8$ are hydrogen or alkyl radicals, $R_4$, $R_5$, $R_6$, $R_7$ and $R_8$ can be identical or different;

n is a number ranging from 1 to 3; and

X is an anion.

Exemplary of this type of product, wherein n=3, $R_4$=$R_5$=$R_6$=$R_7$=$R_8$=$CH_3$, X is chlorine, is a product marketed under the trademark DUOQUAD.

Diamine salts having the following formula (3) are also representative:

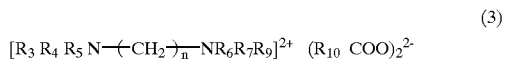
(3)

wherein $R_3$, $R_4$, $R_5$, $R_6$, $R_7$ and n are as defined above, $R_9$ is hydrogen or an alkyl radical, and $R_{10}$ is an alkyl radical, having 8 or more carbon atoms.

The diamine dioleates are illustrative.

The amino acids having the following formulae (4) or (5) can also advantageously be used:

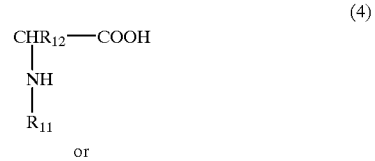
(4)

or

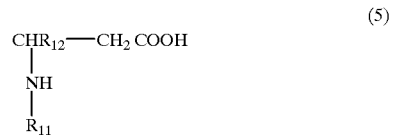
(5)

wherein $R_{11}$ and $R_{12}$ are hydrogen or an alkyl radical, with the proviso that $R_{11}$ and $R_{12}$ cannot simultaneously be hydrogen.

In this case, particularly representative is lauryl betaine ($R_{11}$=$C_{12}$, $R_{12}$=H) sold under the trademark ARMOTERIC LB.

Other useful compounds according to the invention include those having the following formula (6)

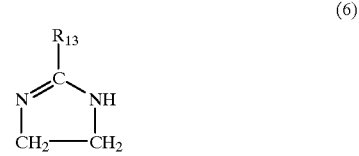
(6)

in which $R_{13}$ is a $C_8$–$C_{22}$, especially $C_8$–$C_{18}$ alkyl radical, and, for example, corresponds to the carbon chain of the fatty acids of tallow, copra, oleic acid, whether or not hydrogenated, or salts of the derivative having the following formula (7):

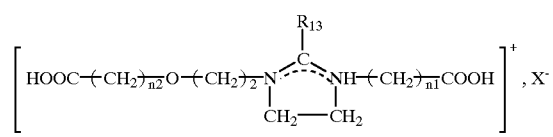
(7)

in which $n_1$ and $n_2$ are whole numbers, identical or different, which can range from 1 to 4 and X is and anion.

More specifically, products marketed under the following trademarks are illustrative:

SOCHAMINE A 7525

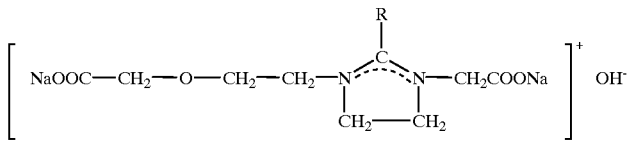

SOCHAMINE A 7527

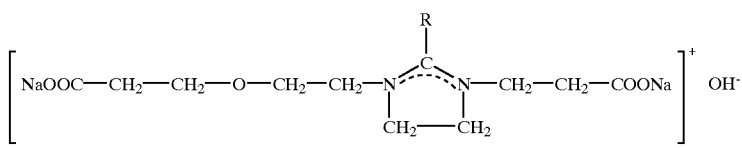

SOCHAMINE A 721

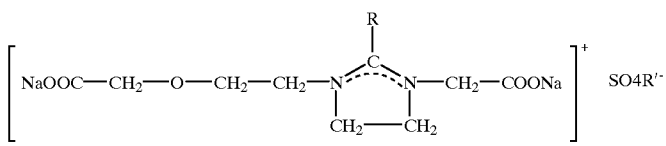

wherein $R'=C_{12}-C_{14}$ alkyl chain, and

R designates the copra radical.

Finally, also illustrative are pyridinium radicals having the formula (8): $R_{14}-C_5H_4NR_{15}^+X^-$(8), wherein X is a halogen, especially chlorine, $R_{14}$ is a radical corresponding to the carbon chain of a fatty acid, especially a $C_{16}$ radical, and $R_{15}$ is an alkyl radical, more specifically $CH_3$.

Solvent

Finally, also in the first step of the subject process, a slightly or non-water miscible organic solvent is used. Of course, the solvent must be compatible with the hydrophobizing agent selected.

This solvent is advantageously selected from among esters, ethers and ketones, and preferably the aliphatic derivatives thereof.

As regards the aliphatic esters, exemplary are the formates, acetates, propionates, butyrates, oxalates, phosphates and lactates.

The acetates, especially the ethyl, isopropyl and butyl acetates, are preferred.

Among the ethers, diisopropyl ether is especially representative.

The aliphatic ketones are advantageously used for carrying out the process according to the invention. Exemplary thereof, methyl isobutyl ketone and ethyl isopropyl ketone are representative.

Other types of solvents which can be used are aromatic solvents or benzene hydrocarbons.

Specifically, xylene and toluene can be used. The halogenated derivatives of these solvents, especially chlorine derivatives, can also be used, for example, chlorobenzene.

Moreover, another type of solvent suitable for use is that of the halogenated aliphatic carbides or halogenated alicyclic hydrocarbons.

The aliphatic or alicyclic halogenated carbides having short $C_1-C_4$ chains are illustrative. They correspond to materials marketed under the trademark FLUGENE.

Trichlorotrifluoroethane and dichlorotetrafluoroethane are especially representative.

The halogenated ethylenic carbides can also be used.

Dichlorethylene, trichlorethylene and tetrachlorethylene are especially representative thereof.

All of the solvents described above can, of course, be used either alone or in combination.

The amount of hydrophobizing agent to be used varies according to the type of silica present in the initial suspension, and especially on its surface area (BET surface area). This amount increases as said surface area increases. It typically ranges from 1% to 60% by weight with respect to the silica expressed in terms of dry solids, i.e., with respect to the amount of $SiO_2$ in the suspension.

More specifically, the amount of hydrophobizing agent as defined above can advantageously range from 1 to 20% if the hydrophobizing agent is much more soluble in water than in the solvent. This is the case with the amine salts. If the hydrophobizing agent is much more soluble in the organic phase than in water, this amount will preferably range from 5 to 60%.

However, the light amines constitute a special case. Indeed, for these, the amount of hydrophobizing agent used will be at least 60% (still measured by weight with respect to the silica expressed in terms of dry solids), more specifically at least 70% for the $C_5-C_6$ amines, and at least 100% for the amines which are $C_4$ or less.

The maximum amount of hydrophobizing agent is not critical in and of itself. For example, in practice it is at most 200%.

The amount of solvent also depends on the type of silica, just as described above for the hydrophobizing agent. This amount is generally such that the ratio of the volume of solvent, expressed in liters/weight of silica in kg (still calculated with respect to $SiO_2$ present in the suspension), varies from 1 to 5, preferably from 1.5 to 4.5.

Indeed, the amount of solvent and hydrophobizing agent are related and depend on the type of hydrophobizing agent as well. For a given amount of hydrophobizing agent, there is a minimum amount of solvent below which the silica does not agglomerate. There is also a maximum amount above which the granules formed stick together and the result is a compact mass of silica.

In general, these minimum and maximum amounts are within the aforementioned ranges of values.

These amounts generally increase with the amount of hydrophobizing agent used, to reach a plateau, as from a certain amount of said hydrophobizing agent.

The silica suspension, hydrophobizing agent and solvent can be contacted and admixed in several ways.

According to a first method, the silica suspension is first mixed with the solvent, then the hydrophobizing agent is added to the mixture thus obtained.

According to a second method, the silica suspension and the hydrophobizing agent are first mixed, then the solvent is added to the mixture thus obtained.

According to a third preferred method, in the case of slightly water-soluble hydrophobizing agents, for example, fatty amines, the solvent and hydrophobizing agent can be mixed in advance, and this mixture can be combined with the silica suspension.

The silica suspension, the hydrophobizing agent and the solvent are mixed together under agitation. Any type of agitation can be used, especially a turbine-type agitator.

The granulometry of the products obtained generally varies as a function of the agitation power. The stronger the agitation, the finer the granulometry.

The temperature at which the mixture is made is theoretically not critical. It typically ranges from room temperature to 80° C. The temperature at which the silica suspension was produced will advantageously be used.

However, the light amines also constitute a special case with respect to temperature. Indeed, it was found that this temperature must preferably increase as the number of carbon atoms in the amine used decreases.

For the $C_4$ amines or less, this temperature will also depend on the organic solvent used, and will generally be at least 50° C., and more specifically about 80° C.

For $C_5$–$C_6$ amines, this temperature also depends on the solvent and the water solubility thereof. Generally, this temperature increases as this solubility increases. Theoretically, it is at least 60° C., and more specifically at least 80° C.

Silica granules and a liquid, generally an aqueous phase, are obtained when the agitation of the reactive medium is terminated.

The second step includes separating the granules and the liquid phase produced. This can be done using any known means, for example, a belt-type filter or centrifuge.

This separation is done easily. This is one of the advantages of the process according to the invention.

After such separation, granules are obtained which correspond especially to the first type described above.

These granules can contain salts, such as, for example, sodium sulfate, for silica suspensions made by neutralizing alkaline silicates with sulfuric acid.

A third step may consequently involve washing, in order to remove the aforementioned impurities.

Several types of washing operations can be carried out.

A wash with solvent-saturated water is effected to eliminate water soluble mineral impurities such as $Na_2SO_4$. This washing is carried out very easily, for example, directly on the filter cake from the second step, or the separation step. As such, the dry product can have $Na_2SO_4$ contents of less than 0.1%.

The granular particulates produced, which correspond to the first embodiment of the invention, can then be dried. This drying can be carried out using any known method.

Thus, to this point, descriptions have been provided for the steps common to the two processes according to the invention, namely, the mixing and agitation step, the separation step and the eventual washing and drying steps.

The second process according to the invention is different from the first in that it comprises a special additional step performed using the granules of the first type.

This step essentially involves densifying the product.

This densification can be done using any operation which allows sufficient mechanical energy to be applied to the granular material to convert it into a denser form.

Because of the properties of the first type of granules, this densification is very easy to achieve. Thus, the fill density of the product in the compacted state can be varied from 0.32 to 0.5 g/ml.

Moreover, again because of the properties of the material, in addition to densification, the diameters of the particulates can also be increased at the same time.

As such, the diameters of the granules can be modified to from approximately 0.5 to 20 mm, more specifically from 0.5 to 10 mm.

The densification can be achieved by agitating the granules. This agitation can be carried out in different ways.

Such can entail agitation by rolling, for example, by transferring the product through a rotary drum or over an inclined disc (agitator bowl) or through a MARUMERIZER type device, i.e., a device having a cylindrical chamber, only the base of which is rotated.

This agitation can be by mechanical action, with the granules being introduced into a container provided with an agitator. As appropriate devices, exemplary are LÖDIGE, MORITZ sphere and GUEDU type devices.

Finally, the densification can in particular be carried out by passing the granules through a fluidized bed, for example, of the ROTOFLUID type.

The granules can be dried and the drying done at the same time as densification, with the drying thus occurring under agitation. It can also be carried out partially during the densification process and partially subsequent thereto, for example, in a drying oven. Finally, it may be carried out in a step totally separate from densification.

In order to further illustrate the present invention and the advantages thereof, the following specific examples are given, it being understood that same are intended only as illustrative and in nowise limitative.

EXAMPLE 1

This example describes granulation tests using different solvents.

The test was carried out in a 1-liter reactor, agitated with a Rushton turbine at 800 revolutions/minute, against blades:

735 g of an aqueous medium containing 70 g/l of $SiO_2$ having a BET specific surface of 125 m$^2$/g and 50 g/l of $Na_2SO_4$, and 100 ml of organic solvent, were introduced into the reactor. A solution of NORAMIUM DA50, having a dry solids content of 10%, was added until granulation occurred.

The results are reported in the following Table 1:

TABLE 1

| Test No. | SOLVENT | Percentage of hydrophobizing agent as dry solids introduced with respect to $SiO_2$ |
| --- | --- | --- |
| 1 | Ethyl acetate | 2.7 |
| 2 | Isobutyl acetate | 3.5 |
| 3 | Diisopropyl ether | 4.1 |
| 4 | Methyl isobutyl ketone (MIBK) | 2.3 |
| 5 | Toluene | 3.4 |
| 6 | MIBK - Flugene 113, 15/85 mixture (by volume) | 5.5 |
| 7 | Tetrachloroethylene | 3.5 |

EXAMPLE 2

A mixture of 15 g of n-octylamine and 100 ml of solvent was added to apparatus identical to that in Example 1, containing 735 g of the same aqueous medium.

The granulation was completed with 20 cm³ of solvent. The results for the various solvents are given in Table 2 below:

TABLE 2

| Test No. | SOLVENT | Percentage of hydrophobizing agent as dry solids introduced, with respect to SiO$_2$ |
|---|---|---|
| 8 | 1,1,2-Trichloro-1,2,2-trifluoroethane (Flugene 113) | 30% |
| 9 | Dibutyl oxide | 30% |
| 10 | Carbon tetrachloride | 30% |
| 11 | Hexane | 30% |

EXAMPLE 3

The same procedure as in Example 1 was used. The solvent was MIBK. Several hydrophobizing agents were tested. The results are reported in Table 3:

TABLE 3

| Commercial name | CHEMICAL FORMULA | Percentage of hydrophobizing agent as dry solids introduced, with respect to SiO$_2$ by weight |
|---|---|---|
| Sochamine 35 (sulfate) | Imidazoline R = C$_{14}$ | 2.3 |
| Sochamine 2662 | Imidazolinium R = C$_{14}$ | 4.0 |
| Sochamine A 7527 | Imidazolinium Dicarboxylate | 5.4 |
| Duoquad T-50 | Quaternary diammonium | 3.0 |
| Armoteric LB | Lauryl Betaine R = C$_{12}$ | 2.2 |
| Armeen Z9 | N-copra aminobutyric acid | 2.8 |
| Noramium DA 50 | Dimethyl benzyl copra ammonium chloride | 2.3 |
| Noramium MS 80 | Trimethyl tallow ammonium chloride (R = C$_{18}$) | 2.2 |
| Noram DMC (sulfate) | N,N-dimethyl copra-ammonium sulfate | 1.8 |

EXAMPLE 4

This example describes the preparation of a granular material product according to the first embodiment of the invention.

A 200-liter reactor was charged with 157.5 kg of silica slurry (T=30° C.) comprising 70 g/l of SiO$_2$ having a BET surface area of 125 m²/g, and 50 g/l of Na$_2$SO$_4$.

The mixture was agitated at 170 revolutions per minute using a MIXEL screw.

Next, 19 kg of MIBK (24 l) was added.

Finally, in a first phase, 4.5 kg of 5% NORAMIUM solution were added.

The mixture was agitated at 310 rpm.

In a second phase, 0.8 kg of 5% NORAMIUM solution was added.

It was agitated for an additional 5 minutes, and granulation was observed.

Filtration under vacuum was then carried out, for 3 minutes.

The filter cake had the following composition (% weight): SiO$_2$: 21% H$_2$O: 46% MIBK: 33%

The granular material was washed in two stages:

First, 100 l of water saturated with MIBK were used; this was re-pulped over the filter, and filtered under vacuum.

Next, using 50 l of water saturated with MIBK and containing 400 ppm of NORAMIUM, it was re-pulped over the filter, and again filtered under vacuum.

The resulting material was oven dried at 110° C.

The dried product had a non-compacted density of 0.2 and a mean particle size of 1 mm.

It had a VPT of 2.91 cm³/g, a CTAB surface area of 105 m²/g and a BET surface area of 95 m²/g.

EXAMPLE 5

735 cm³ of a silica slurry comprising 70 g/l of silica and 50 g/l of Na$_2$SO$_4$, the silica having a BET surface area of 125 m²/g, were charged into a reactor of the same type as in Example 1.

40 g of a NORAMIUM DA 50 solution having a dry solids content of 10% and 150 cm³ of a mixture of MIBK and Flugene 113 (respective volume ratio of 15–85) were added. This was agitated for 3 hours at 800 rpm. It was then filtered and oven dried at 110° C. The product had a density of 0.28 g/ml and a mean particle size of 1 mm. The total pore volume was 1.68 cm³/g.

EXAMPLE 6

This example illustrates the preparation of granular material according to the second embodiment of the invention.

The moist cake produced in Example 4 was used as the starting material. The product was dried in a 10-liter MORITZ sphere. The speed of agitation and temperature of the sphere were varied.

The results are reported in Table 4 below:

TABLE 4

| Test No. | Wet weight (g) | T (° C.) | Agitator rotation speed (rpm) | Granulation time in minutes | Density (g/ml) | Avg. d (mm) | Total pore volume cm³/g |
|---|---|---|---|---|---|---|---|
| 1 | 2,100 | 70 | 550 | 20 | 0.41 | 1 | 1.00 |
| 2 | 2,100 | 80 | 550 | 15 | 0.35 | 1 | 1.25 |
| 3 | 2,100 | 90 | 550 | 8 | 0.37 | 1 | 1.16 |
| 4 | 2,100 | 80 | 440 | 17 | 0.32 | 2.5 | 1.4 |

EXAMPLE 7

A suspension of 472 g of silica in 3,700 g of water (silica BET surface area of 125 m²/g) was placed in a 5-liter reactor equipped with an anchor agitator. An INIPOL solution having the formula

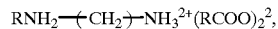

wherein R=C$_{18}$, and the amount of hydrophobizing agent with respect to SiO$_2$ was 6% by weight, was added. It was agitated for 15 minutes; then 860 g of ethyl acetate were added. It was agitated again for 15 minutes. Finally, 200 g of ethyl acetate were added.

This material was filtered and the resulting cake was dried in a MORITZ sphere as in Example 6, at a temperature of 80° C. for 10 minutes and at an agitation speed of 550 rpm. A product having a density of 0.47 g/ml and VPT of 0.81 cm$^3$/g was obtained.

EXAMPLE 8

This example also illustrates the preparation of a densified granular material. The starting material was 4,300 g of a 13.4% suspension, in water, of silica having a BET surface area of 125 m$^2$/g.

This suspension was placed in a 10-liter reactor and, under agitation, 35 g of a solution of INIPOL 002 (diamine dioleate) in 200 g of ethyl acetate were added over 10 minutes.

Next, over 35 minutes, 1,075 g of ethyl acetate were added.

The granules obtained were filtered, and then 2,000 g of the product were dried in a 10-liter MORITZ sphere at a temperature of 70° C., with the agitator rotating at a speed of 300 rpm. The granulation time was 60 minutes.

A product having a relative density of 0.44 g/ml, a mean diameter of 0.3 mm and VPT of 0.91 cm$^3$/g was obtained.

EXAMPLE 9

This example illustrates the use of light amines. 727 g of an aqueous medium containing 7.7% by weight of a silica having a BET surface area of 125 m$^2$/g and 92.3% by weight of water were charged into a 1-liter reactor.

Agitation was fixed at 800 rpm.

First, 160 g of C$_2$Cl$_4$ were rapidly added. Next, the required amount of amine was added over 5 minutes.

The medium was maintained under agitation for 10 minutes.

The granules were filtered, then dewatered under vaccum for 1 minute and oven dried under a vacuum at 80° C.

The principal operating conditions are reported below:

| T ° C. | Amine | Kg Amine/Kg SiO$_2$ | Amount of amine used in g |
|---|---|---|---|
| 80 | n-butylamine | 1.3 | 75.5 |
| 80 | cyclohexylamine | 0.7 | 40 |

The granular materials obtained in these two experiments had the following characteristics:

(a) Density : 0.26 g/ml,
(b) Mean particle size : 0.8 mm,
(c) BET surface area : 125 m$^2$/g,
(d) Total pore volume : 1.84 cm$^3$/g.

EXAMPLE 10

This example illustrates the high level of resistance to attrition of the granular materials according to the invention.

Resistance to attrition was measured under the following conditions.

A container was used, the base of which was provided with a calibrated nozzle, through which a jet of air was blown. The diameter of the nozzle can vary from 300 to 1000 μm. The speed of the air in the nozzle varied from 50 to 200 m/s.

The container was filled with a weight P of granular material corresponding to a granulometric fraction of 0.2 to 1 mm.

The air flow was adjusted such that it was sufficient to fluidize the bed.

For a given weight P of granular material, a given air flow Q and a given nozzle diameter, after 30 minutes of blowing air into the apparatus, the granules remaining in the bed were recovered and passed over a sieve corresponding to the granulometric fraction mentioned above, and the weight loss was measured.

Different measurements were made using different nozzle diameters, and thus different flowspeeds of air.

By plotting weight loss as a function of air speed, the curve produced had a plateau up to a critical speed $V_{cr}$ after which the grains or particles begin to break and the curve had a significantly increasing slope.

This speed corresponds to the minimum amount of energy needed to cause the production of fines from the materials tested.

For the products of Example 5 and Example 6, Test No. 1, this critical speed was 80 m/s.

For a granular product according to the prior art (European Patent No. 18,866), this critical speed was only 65 m/s.

EXAMPLE 11

This example illustrates the use of the granular material of the invention for reinforcing elastomeric matrices.

First, a granular material (1) was prepared according to the invention, using the granulation procedure of Example 7. However, the silica had a BET surface area of 175 m$^2$/g, and the hydrophobizing agent was NORAMIUM DA 50, used in a percentage of 5.4% by weight with respect to the SiO$_2$. Turbine agitation was employed. The product obtained was oven dried for 24 hours at 120° C.

A second granular material (2) was prepared in the same manner as in Example 7. However, the hydrophobizing agent was diamine dioleate CEMULCAT ODO used in a percentage of 6% by weight with respect to SiO$_2$.

The product obtained was densified in a MORITZ sphere, then dried for 24 hours at 120° C.

The product (3) was of the type described in European Patent 18866. It has a BET surface area of 175 m$^2$/g.

The above products were incorporated into a mixture having the following composition:

|  |  | Parts by weight |
|---|---|---|
| (i) | SBR 1509 rubber | 100.00 |
| (ii) | Silica | 50.00 |
| (iii) | Polyethylene glycol MW = 4,000 | 3.00 |
| (iv) | Stearic acid | 3.00 |
| (v) | Zinc oxide | 3.00 |
| (vi) | Accelerator |  |
|  | Benzothiazyl disulfide VULCAFOR MBTS | 0.75 |
| (vii) | VULCAFOR diorthotolylguanidine | 1.50 |

| | | Parts by weight |
|---|---|---|
| | accelerator | |
| (viii) | Antioxidant (PERMANAX OD) | 2.00 |
| (ix) | Sulfur | 2.25 |

The following rheological properties were determined:

[1] Mechanical Properties

MONSANTO Rheometer (ASTM D 2084)

Measurement of the rheological properties of the mixture during vulcanization.

MT=Maximum Torque after complete crosslinking, mT=Minimum Torque: Consistency of the non-vulcanized mixture ("raw mixture") at the test temperature.

ΔT (Torques): related to the degree of crosslinking.

[2] Static properties

These were measured according to the following standards:

(a) ASTM D 2240-75

Shore A hardness (b) ASTM D 1054-55

Resilience

[3] Dynamic properties

ASTM D 623-67

Goodrich Fleximeter

This apparatus made it possible to subject vulcanized rubber to alternating deformations and to determine its resistance to fatigue and internal heating.

(a) $\Delta_C$: Δ between the temperature at the core of the test piece and the chamber temperature (internal heating).

(b) Test conditions:

Load 106 N, deflection 22.2%, frequency 21.4 Hz

Chamber temperature=50° C.

The results are reported in Table 5:

TABLE 5

| | Product Properties | 1 | 2 | 3 |
|---|---|---|---|---|
| | Apparent density of the product | 0.21 | 0.37 | 0.25 |
| Properties in Rubber Mixture | Torques Δ | 64 | 64 | 68 |
| | Shore A hardness | 69 | 69 | 69 |
| | Rebound % | 25 | 25 | 25 |
| | Heating Δ $T_C$ ° C. | 112 | 100 | 110 |

These results show that the properties of the granular materials according to the invention are completely comparable to those of the product (3) of the prior art, with respect to the reinforcement of rubber matrices. There is no significant difference in crosslinking.

The Shore hardnesses are identical, rebound and heating are practically identical for non-densified granular materials, and these properties are improved in the densified products.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A plurality of essentially spherical silica-based granular particulates having a mean particle size of at least 0.4 mm, apparent density of at least 0.35 g/ml, and having a total pore volume of at most 1.40 cm³/g.

2. The silica-based granular particulates as defined by claim 1, having a mean particle size of from 0.5 to 20 mm.

3. The silica-based granular particulates as defined in claim 1, having an apparent density ranging from 0.35 to 0.5 g/ml.

4. The silica-based granular particulates as defined by claim 1, comprising a silica having a BET surface area of at least 50 m²/g, and a CTAB surface area of at least 40 m²/g.

5. The silica-based granular particulates as defined by claim 1, wherein at least about 80% of the total pore volume thereof comprises pores having a diameter at most substantially equal to the following values in relationship to the BET surface area:

50–100 m²/g:0.12 μm

100–150 m²/g:0.075 μm

150–200 m²/g:0.050 μm

200–250 m²/g:0.025 μm

>250 m²/g:0.015 μm.

6. The silica-based granular particulates as defined by claim 1, comprising precipitated silica.

7. The silica-based granular particulates as defined by claim 1, comprising from about 0.5 to 35% by weight of a hydrophobizing agent.

8. A shaped article which comprises an elastomeric matrix and a reinforcing amount of a filler material therefor, said filler material comprising the silica-based granular particulates as defined by claim 1.

9. The silica-based granular particulates as defined by claim 2, having a mean particle size of from 0.5 to 10 mm.

10. The silica-based granular particulates as defined by claim 4, wherein said BET surface area ranges from 50 to 350 m²/g, and said CTAB surface area ranges from 40 to 320 m²/g.

11. The silica-based granular particulates as defined by claim 10, wherein said BET surface area ranges from 100 to 300 m²/g, and said CTAB surface area ranges from 80 to 270 m²/g.

12. The silica-based granular particulates as defined by claim 1, having a total pore volume ranging from 0.7 to 1.40 cm³/g.

13. A plurality of essentially spherical silica-based granular particulates having a mean particle size of at least 80 μm, an apparent density of at least 0.35 g/ml, and having a total pore volume of at most 1.40 cm³/g.

14. The silica-based granular particulates as defined by claim 13, having an apparent density ranging from 0.35 to 0.5 g/ml.

15. The silica-based granular particulates as defined by claim 13, comprising a silica having a B.E.T. surface area of at least 50 m²/g, and a CTAB surface area of at least 40 m²/g.

16. The silica-based granular particulates as defined by claim 1, having an apparent density of 0.41 g/ml.

17. The silica-based granular particulates as defined by claim 1, having an apparent density of 0.47 g/ml.

* * * * *